US008331222B2

(12) United States Patent
Yan et al.

(10) Patent No.: US 8,331,222 B2
(45) Date of Patent: Dec. 11, 2012

(54) LINK FAULT HANDLING METHOD AND DATA FORWARDING APPARATUS

(75) Inventors: Gang Yan, Shenzhen (CN); Baorong Zhan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 12/815,184

(22) Filed: Jun. 14, 2010

(65) Prior Publication Data

US 2010/0260041 A1 Oct. 14, 2010

Related U.S. Application Data

(63) Continuation of application No. PCT/CN2008/073512, filed on Dec. 15, 2008.

(30) Foreign Application Priority Data

Dec. 14, 2007 (CN) .......................... 2007 1 0179574

(51) Int. Cl.
*G06F 11/00* (2006.01)
(52) U.S. Cl. ........ 370/225; 370/241; 370/242; 709/223; 709/224
(58) Field of Classification Search .......... 370/216–228, 370/241–253; 709/223–224
See application file for complete search history.

(56) References Cited

U.S. PATENT DOCUMENTS

| 5,260,945 | A | 11/1993 | Rodeheffer |
| 7,020,814 | B2 * | 3/2006 | Ryle et al. ..................... 714/712 |
| 2007/0159975 | A1 | 7/2007 | Suzuki et al. |
| 2009/0010153 | A1 * | 1/2009 | Filsfils et al. ................. 370/218 |

FOREIGN PATENT DOCUMENTS

| CN | 1671225 A | 9/2005 |
| CN | 1890928 A | 1/2007 |
| CN | 1925429 A | 3/2007 |
| CN | 1319320 C | 5/2007 |
| EP | 1 696 609 A1 | 8/2006 |
| EP | 1 816 801 A1 | 8/2007 |

OTHER PUBLICATIONS

Communication pursuant to Article 94(3) EPC dated Feb. 16, 2012 in connection with European Patent Application No. 08 867 396.7.
Supplementary European Search Report dated Apr. 26, 2011 in connection with European Patent Application No. EP 08 86 7396.
International Search Report dated Mar. 12, 2009 in connection with International Patent Application No. PCT/CN2008/073512.
Written Opinion of the International Searching Authority dated Mar. 26, 2009 in connection with International Patent Application No. PCT/CN2008/073512.
Partial Translation of Office Action dated Jun. 2, 2010 in connection with Chinese Patent Application No. 200710179574X.

* cited by examiner

*Primary Examiner* — Charles C Jiang (57) ABSTRACT

A link fault handling method and a data forwarding apparatus are provided herein. The method includes: A first data forwarding apparatus keeps a neighboring relation with a second data forwarding apparatus after a link between the first data forwarding apparatus and the second data forwarding apparatus fails intermittently. The link between the first data forwarding apparatus and the second data forwarding apparatus fails intermittently in this way: A first fault detecting module in the first data forwarding apparatus receives no fault detection message from the second data forwarding apparatus at a preset time of receiving the message, but receives the fault detection message from the second data forwarding apparatus in an intermittency period after the preset time of receiving the message. The embodiments of the present invention shorten the convergence time of the upper-layer application module, improve the convergence performance, save CPU resources of the data forwarding apparatus, and improve working performance of the data forwarding apparatus.

12 Claims, 9 Drawing Sheets

LINK FAULT HANDLING METHOD AND DATA FORWARDING APPARATUS

CROSS-REFERENCE TO RELATED APPLICATIONS

This application is a continuation of International. Application No. PCT/CN2008/073512, filed on Dec. 15, 2008, which claims priority to Chinese Patent Application No. 200710179574.X, filed on Dec. 14, 2007, both of which are hereby incorporated by reference in their entireties.

TECHNICAL FIELD

The present invention relates to communication technologies, and in particular, to a link fault handling method and a data forwarding apparatus.

BACKGROUND

With the rapid popularization of networks and diversification of network applications, the network traffic is expanding, and the network scope is increasing. It is more and more difficult to maintain and manage network devices. Therefore, an important feature of a network device required is: The network device needs to provide the fault detection function; when the path between neighboring network devices is faulty in the communication process, the network device can detect the fault quickly, and set up a new channel in place of the faulty channel or switch the communication from the faulty channel over to other links. Some existing network devices such as Synchronous Digital Hierarchy (SDH) devices and Resilient Packet Ring (RPR) already provide the foregoing function of fault detection. However, a lot of hardware and software still provides no fault detection function. For example, the forwarding engine and interfaces of the Internet Protocol (IP) data packet forwarding devices are unable to implement end-to-end detection.

In the existing network system, fault detection is performed for the path between network devices through a slow handshake (Hello) mechanism. Without assistance of hardware, the fault detection takes a long time. For example, it takes about two seconds to detect the fault of the link between the network devices through an Open Shortest Path First (OSPF) protocol, and it takes about one second to detect the fault of the link between network devices through an Intermediate System-to-Intermediate System (ISIS) protocol. When the data transmission rate is high, for example, the data transmission rate is of a gigabit level, long detection time leads to huge loss of data. Moreover, the detection of the link fault requires the network device nodes to support the routing protocol, and link state detection is impossible for the nodes that do not support the routing protocol.

In order to speed up the detection of faults of the link between network devices and shorten the fault detection time, a Bidirectional Failure Detection (BFD) module is added in the network devices in the prior art. The BFD module sends the fault detection messages quickly to implement fast detection of link faults. The BFD module can perform fault detection for any type of data paths in a network system or between network systems, for example, direct physical links, virtual circuits, tunnels, Multi-Protocol Label Switching (MPLS) Label Switched Paths (LSPs), multi-hop route paths, and indirect paths. After detecting a link fault, the BFD module notifies the upper-layer application modules in the network device such as Interior Gateway Protocol (IGP) module, Border Gateway Protocol (BGP) module, MPLS module, and multicast module to handle the detected fult.

Figure 1:
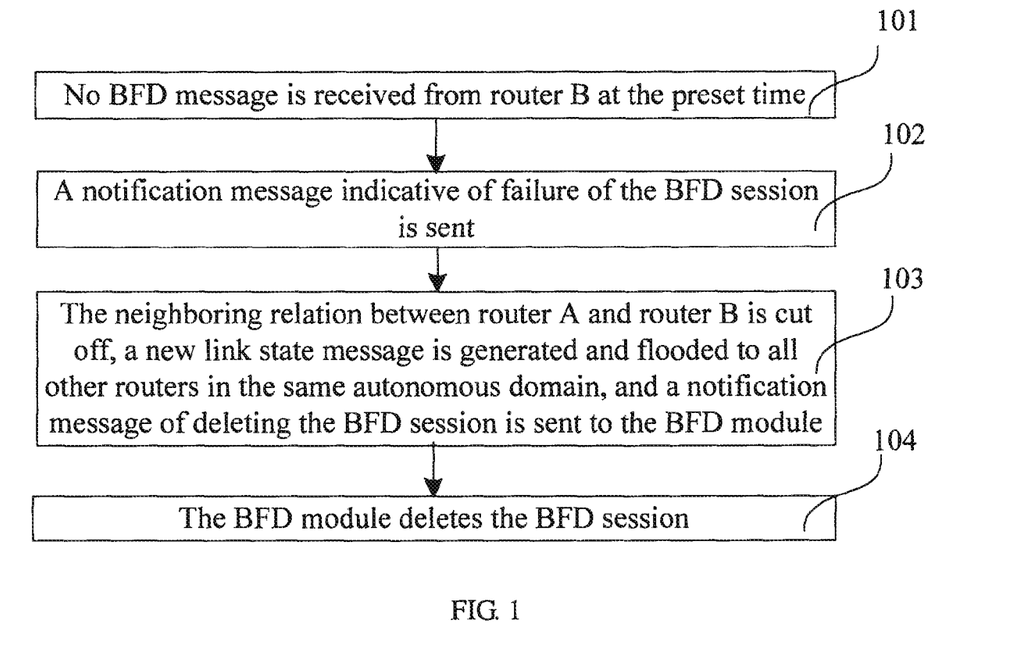
FIG. 1 is a flowchart of link fault detection performed through a BFD protocol in the prior art.

FIG. 1 is a flowchart of detecting link faults through a BFD protocol in the prior art. Supposing that the BFD module in router A performs the fault detection, the fault detection process includes the following steps:

Step 101: The BFD module in router A does not receive the BFD message from the BFD module in router B in the preset time, and believes that the link between router A and router B is faulty.

Step 102: The BFD module in router A sends a BFD Session Down message to the IGP module in router A.

Step 103: The IGP module in router A cuts off the neighboring relation between router A and router B, generates a new link state message that indicates the network topology around router A, and floods the message about change of the network topology to all other routers in the same autonomous domain. Meanwhile, the BFD module in router A sends a notification message of deleting the BFD session.

Step 104: The BFD module in router A deletes the BFD session.

After the fault is cleared on link between router A and router B, the IGP module in router A uses a slow handshake (Hello) mechanism to discover the neighboring router B again, sets up a neighboring relation with router B again, calculates the route to router B, and instructs the BFD module in router A to create a BFD session again.

In the process of developing the present invention, the inventor finds at least the following problems in the prior art:

When the BFD module detects the link fault, the IGP module cuts off the neighboring relation with the router that uses the faulty link, generates a new link state message, floods the network topology change message to all routers in the same autonomous domain, and notifies the BFD module to delete the BFD session. After the links recovers from the fault, the IGP module uses its slow handshake (Hello) mechanism to discover the neighboring router again, sets up a neighboring relation with the neighboring router, and calculates the route to the neighboring router. In this case, if the link between the routers is cut off intermittently, namely, if the link fails but can recover quickly, the link failure time is less than the sending period of the Hello message. For example, the link failure time is a few milliseconds. In this case, because the default time of sending the Hello message from the IGP module is relatively long, which is generally ten seconds, it takes a long time to set up a neighboring relation again. Even if the link recovers quickly, the link is not available until a neighboring relation is set up with the IGP module again and the route is calculated. The convergence time of the IGP module is long, which reduces the convergence performance of recovery of the link. Moreover, massive route calculation consumes many Central Processing Unit (CPU) resources of the router, and affects the working performance of the router.

SUMMARY

The technical objectives of the embodiments of the present invention are to shorten the convergence time after intermittent failure of a link between data forwarding apparatuses, improve convergence performance, save CPU resources of the data forwarding apparatus, and improve working performance of the data forwarding apparatus.

A link fault handling method provided herein includes:

by a first data forwarding apparatus, keeping a neighboring relation with a second data forwarding apparatus after a link between the first data forwarding apparatus and the second data forwarding apparatus fails intermittently.

A data forwarding apparatus provided herein includes:

a timing module (501), configured to count time;

a first fault detecting module (503), configured to receive and send a fault detection message; perform fault detection for a link between the data forwarding apparatus and a neighboring data forwarding apparatus according to the received fault detection message; and generate a notification message indicative of failure or recovery of a fault detection session when the link fails intermittently, or generate a link fault notification message when the link fails continuously; and a first upper-layer application module (504), configured to keep, when the link fails intermittently, a neighboring relation between the data forwarding apparatus and the neighboring data forwarding apparatus, generate a first new link state message, and flood the first new link state message to other data forwarding apparatuses which locate in the same autonomous domain with the first data forwarding apparatus, wherein the first new link state message indicates network topology around the data forwarding apparatus; cut off, when the link fails continuously, the neighboring relation, and instruct the first fault detecting module (503) to delete generated fault detection session.

Another data forwarding apparatus provided herein includes:

a timing module (501), configured to count time;

a second fault detecting module (601), configured to receive and send a fault detection message; perform fault detection for a link between the data forwarding apparatus and a neighboring data forwarding apparatus; and generate a notification message indicative of failure or recovery of a fault detection session when the link fails intermittently; and a second upper-layer application module (602), configured to start the timing module (501) to count time after receiving the notification message indicative of a failure of the fault detection session from the second fault detecting module (601), keep a neighboring relation between the data forwarding apparatus and the neighboring data forwarding apparatus, generate a new link state message and flood the new link state message to other data forwarding apparatuses which locate in the same autonomous domain with the first data forwarding apparatus, wherein the new link state message indicates the network topology around the data forwarding apparatus; and cut off the neighboring relation when within an intermittency period after receiving the notification message indicative of failure no notification message indicative of recovery of the fault detection session is received from the second fault detecting module (601), and instruct the second fault detecting module (601) to delete the generated fault detection session.

Another data forwarding apparatus provided herein includes:

a timing module 501, adapted to count time;

a third fault detecting module 701, adapted to: receive and send a fault detection message; perform fault detection for a link between data forwarding apparatuses according to the received fault detection message; and generate a link fault notification message when the link fails continuously between the data forwarding apparatus and the neighboring data forwarding apparatus according to timing information of the timing module 501; and a third upper-layer application module 702, adapted to: cut off the neighboring relation between the data forwarding apparatus and the neighboring data forwarding apparatus after receiving the link fault notification message sent by the third fault detecting module 701, and instruct the third fault detecting module 701 to delete the generated fault detection message.

According to the embodiments of the present invention, when the link between the first data forwarding apparatus and the second data forwarding apparatus fails intermittently, the neighboring relation between the first data forwarding apparatus and the second data forwarding apparatus is maintained. In this way, when the link recovers, it is not necessary to wait for the data forwarding apparatus to use its slow handshake (Hello) mechanism to discover the neighboring data forwarding apparatus again, to set up the neighboring relation between the data forwarding apparatuses again, or to calculate the route between them again. Compared with the prior art, the embodiments of the present invention shorten the convergence time of the upper-layer application module and improve the convergence performance. In no need of re-calculating the route, the CPU resources of the data forwarding apparatus are saved, and the working performance of the data forwarding apparatus is improved.

DETAILED DESCRIPTION

In the embodiments of the present invention, when the link between the first data forwarding apparatus and the second data forwarding apparatus fails intermittently, the neighboring relation between the first data forwarding apparatus and the second data forwarding apparatus is maintained. In this way, when the link recovers, it is not necessary to discover the neighboring data forwarding apparatus again or set up the neighboring relation between the first data forwarding apparatus and the second data forwarding apparatus again. Therefore, the embodiments of the present invention shorten the convergence time in the case of intermittent failure of the link between the data forwarding apparatuses, improve the convergence performance of link recovery, avoid route calculation flooding, save the CPU resources of the data forwarding apparatus, and improve the working performance of the data forwarding apparatus.

The data forwarding apparatuses in the following embodiments may be IP-based, for example, routers. In the data forwarding apparatus, the fault detecting module may be a BFD module or a RPR ring module which has fast detect capability, and the upper-layer application module may be an IGP module, a BGP module, an MPLS module, or a multicast module. In the following embodiments, it is assumed that the data forwarding apparatus is a router, the fault detecting module is a BFD module, and the upper-layer application module is an IGP module. The fault detection message sent between the BFD module of one data forwarding apparatus and the BFD module of another data forwarding apparatus is a BFD message, i.e., a BFD session exists between the BFD modules.

A link fault handling method provided in an embodiment of the present invention includes:

detecting that a link fails and starting a timer;

sending a notification message indicative of failure of the link; and receiving the fault detection message before the timer expires, keeping a neighboring relation with a neighboring router connected through the link, generating route information, and sending the route information.

Figure 2:
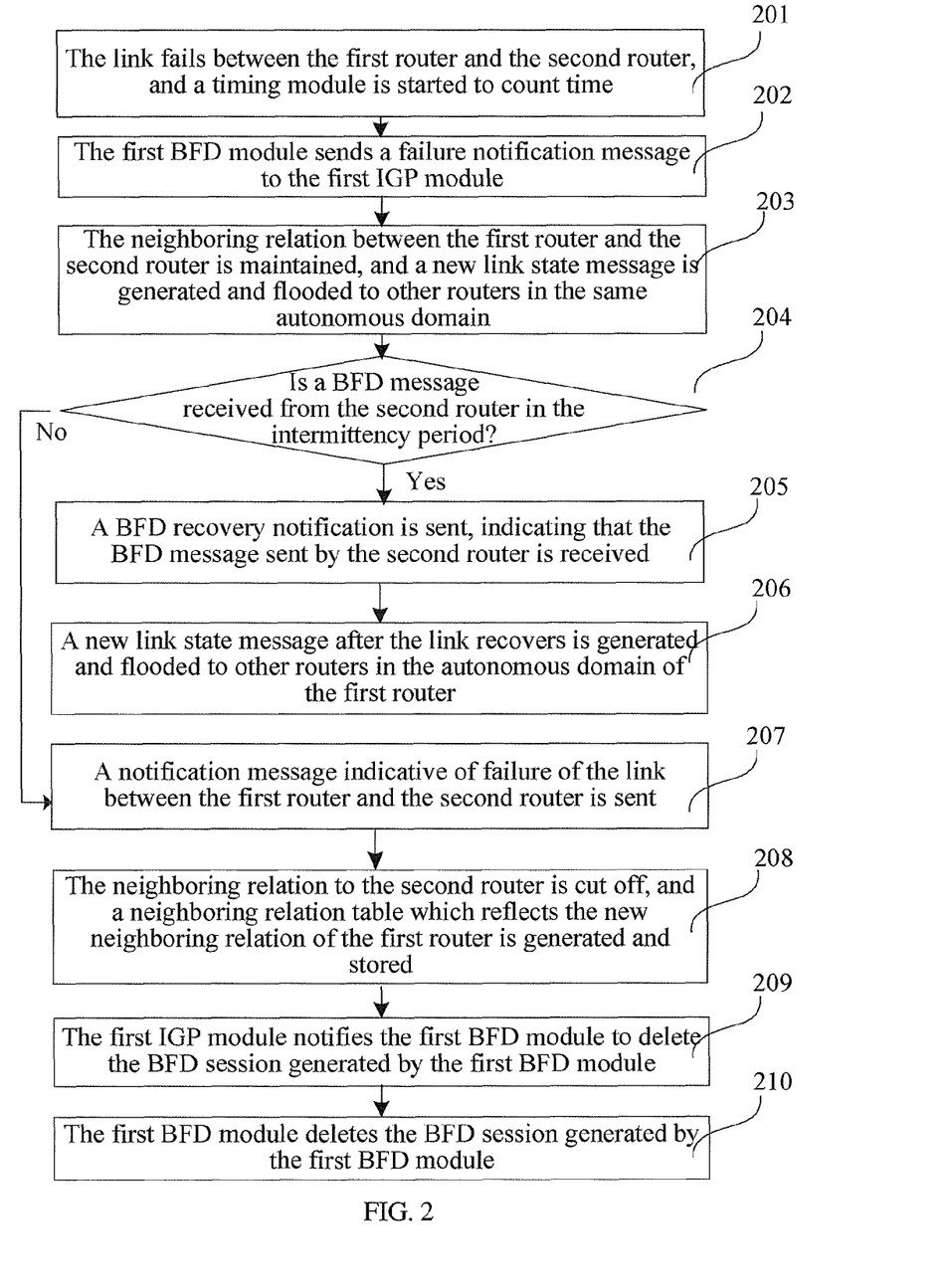
FIG. 2 is a flowchart of a link fault handling method in the first embodiment of the present invention.

FIG. 2 is a flowchart of a link fault handling method in the first embodiment of the present invention. The method includes the following steps:

Step 201: The first BFD module in the first router receives no BFD message from the second router at a preset time, and knows that the link between the first router and the second router fails. Therefore, the first BFD module starts a timing module to count time.

Step 202: The first BFD module sends a notification message indicative of failure of the BFD session to the first IGP module in the first router.

Step 203: The first IGP module keeps the neighboring relation between the first router and the second router, generates a new link state message which indicates the network topology around the first router after the link is cut off between the first router and the second router, and sends the new link state message to other routers in the same autonomous system.

Step 204: According to the timing information of the timing module, the first BFD module judges whether the BFD message is received from the second router within an intermittency period after failure of receiving the BFD message from the second router at the preset time. The intermittency period is preset on the timer. If the BFD message is received from the second router through the link between the first router and the second router within this intermittency period, it indicates that the link fails intermittently, and the process proceeds to step 205; or, if no BFD message is received from the second router within the intermittency period, it indicates that the link fails continuously, and the process proceeds to step 207.

Specifically, the intermittency period is less than an interval of sending Hello messages. The intermittency period is counted through a timer. If the BFD message is received from the second router before expiry of the timer, it indicates that the link fails intermittently; if no BFD message is received from the second router before expiry of the timer, it indicates that the link fails continuously.

Step 205: The first BFD module sends a notification message indicative of recovery of the BFD session (BFD Session Up) to the first IGP module. The notification message indicates that the BFD message is received from the second router.

Step 206: The first IGP module generates a new link state message which indicates the network topology around the first router after the link recovers between the first router and the second router, and floods the new link state message to other routers in the autonomous domain of the first router.

Step 207: The first BFD module sends to the first IGP module a notification message indicative of failure of the link between the first router and the second router.

Step 208: The first IGP module cuts off the neighboring relation with the second router, and generates and stores a neighboring relation table which reflects the new neighboring relation of the first router.

Step 209: The first IGP module notifies the first BFD module to delete the BFD session generated by the first BFD module.

Step 210: The first BFD module deletes the BFD session generated by the first BFD module.

If the neighboring relation between the first router and the second router is cut off and the BFD session is deleted, the second router is unable to send a BFD message to the first BFD module in the first router again after recovery of the link between the first router and the second router. In this case, the first IGP module needs to use a Hello mechanism to discover the first router again, set up the neighboring relation between the first router and the second router, and calculate the route between the first router and the second router.

Because the neighboring relation between the first router and the second router is maintained, after the link recovers between the first router and the second router, the first router can receive the BFD message sent by the second router. In this way, it is not necessary to wait for the first IGP module to discover the neighboring router again through its slow Hello mechanism, set up the neighboring relation between the first router and the second router, or calculate the route between them. The convergence time of the first IGP module is shortened, and the convergence performance is improved. Without route calculation, the CPU resources of the router are saved and the working performance of the router is improved.

Figure 3:
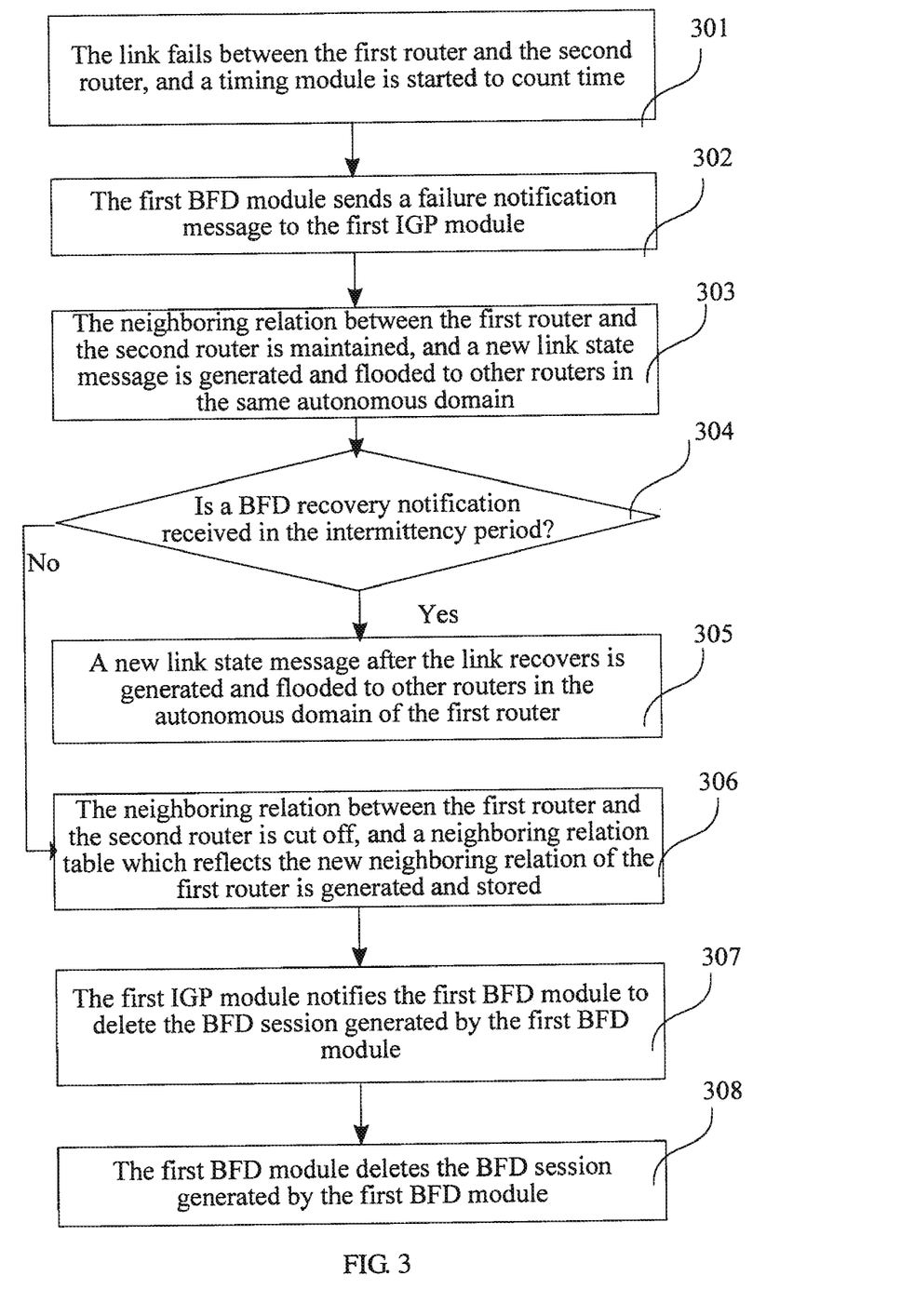
FIG. 3 is a flowchart of a link fault handling method in the second embodiment of the present invention.

FIG. 3 is a flowchart of a link fault handling method in the second embodiment of the present invention. The method includes the following steps:

Step 301: The first BFD module in the first router receives no BFD message from the second router at a preset time, and knows that the link between the first router and the second router fails. Therefore, the first BFD module starts a timing module to count time.

Step 302: The first BFD module sends a notification message indicative of failure of the BFD session to the first IGP module in the first router.

Step 303: The first IGP module keeps the neighboring relation between the first router and the second router, generates a new link state message which indicates the network topology around the first router after the link is cut off between the first router and the second router, and floods the new link state message to other routers in the same autonomous domain.

Step 304: According to the timing information of the timing module, the first BFD module judges whether a notification message indicative of recovery is received from the first BFD module within an intermittency period after the first IGP module sends the notification message indicative of failure of the BFD session, where the notification message indicative of recovery indicates that the BFD message is received from the second router successfully, and the intermittency period is preset on the timer. If the BFD message is received from the second router within this intermittency period, it indicates that the link fails intermittently, and the process proceeds to step 305; or, if no BFD message is received from the second router within the intermittency period, it indicates that the link fails continuously, and the process proceeds to step 306.

Specifically; the intermittency period may be less than an interval of sending Hello messages.

Step 305: After receiving the notification message indicative of BFD recovery from the first BFD module, the first IGP module generates a new link state message which indicates the network topology around the first router after the link recovers between the first router and the second router, and floods the new link state message to other routers in the autonomous domain of the first router.

Step 306: The first IGP module cuts off the neighboring relation with the second router, and generates and stores a neighboring relation table which reflects the new neighboring relation of the first router.

Step 307: The first IGP module notifies the first BFD module to delete the BFD session generated by the first BFD module.

Step 308: The first BFD module deletes the BFD session generated by the first BFD module.

Figure 4:
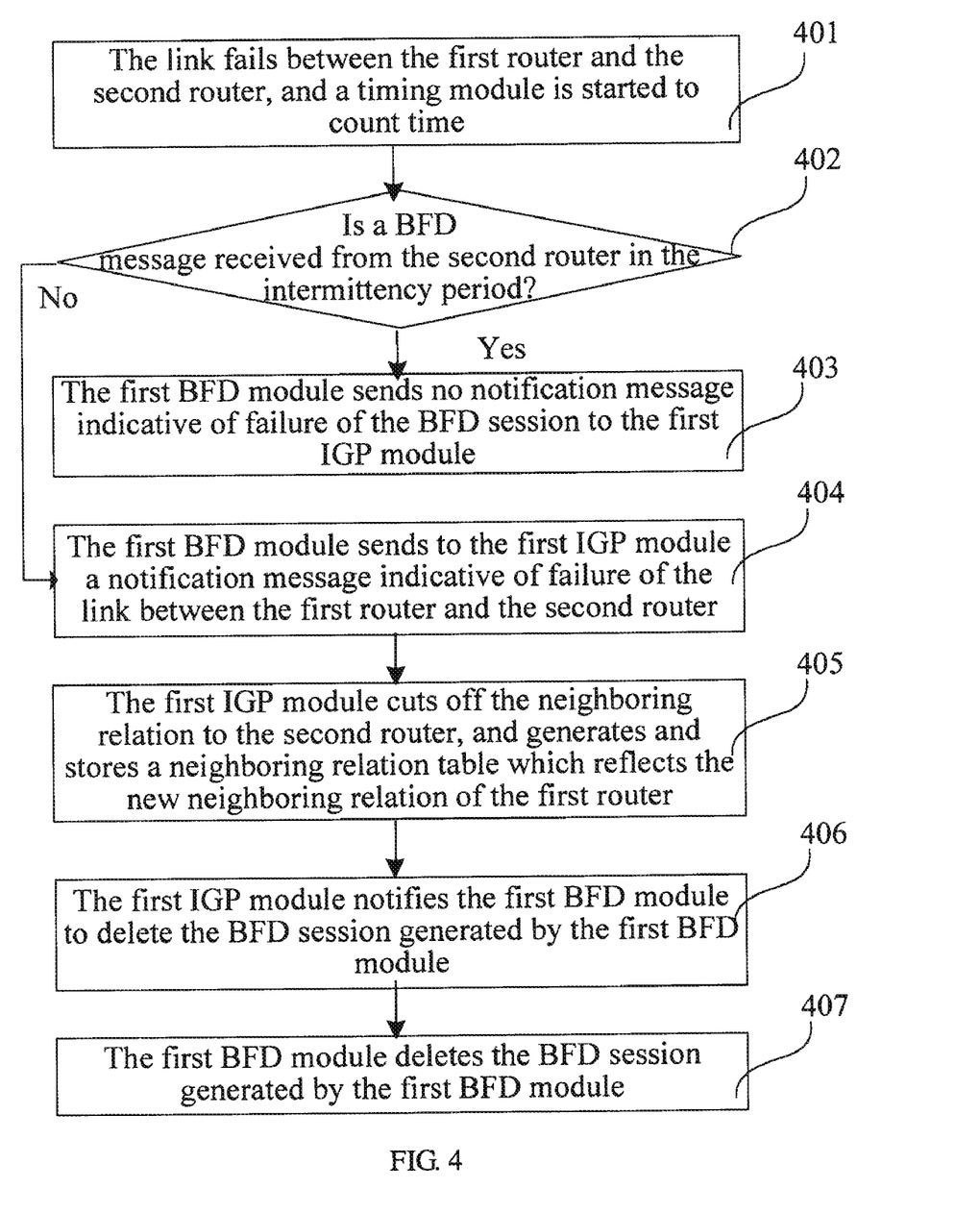
FIG. 4 is a flowchart of a link fault handling method in the third embodiment of the present invention.

FIG. 4 is a flowchart of a link fault handling method in the third embodiment of the present invention. The method includes the following steps:

Step 401: The first BFD module in the first router receives no BFD message from the second router at a preset time, and knows that the link between the first router and the second router fails. Therefore, the first BFD module starts a timing module to count time.

Step 402: According to the timing information of the timing module, the first BFD module judges whether the BFD message is received from the second router within an intermittency period after failure of receiving the BFD message from the second router at the preset time. The intermittency period is preset on the timer. If the BFD message is received from the second router within this intermittency period, it indicates that the link fails intermittently, and the process proceeds to step 403; or, if no BFD message is received from the second router within the intermittency period, it indicates that the link fails continuously, and the process proceeds to step 404.

Specifically, the intermittency period is less than an interval of sending Hello messages.

Step 403: The first BFD module sends no notification message indicative of failure of the BFD session to the first IGP module.

Step 404: The first BFD module sends to the first IGP module a notification message indicative of failure of the link between the first router and the second router.

Step 405: The first IGP module cuts off the neighboring relation with the second router, and generates and stores a neighboring relation table which reflects the new neighboring relation of the first router.

Step 406: The first IGP module notifies the first BFD module to delete the BFD session generated by the first BFD module.

Step 407: The first BFD module deletes the BFD session generated by the first BFD module.

In the foregoing embodiments, the intermittency period may change dynamically to suit the network change caused by emergencies. Generally, a normally running network is stable, and the probability of frequent network change is low. Therefore, the intermittency of the link between a router and the neighboring router within a period may be counted. If the network topology changes frequently, the intermittency period may increase with the increase of the frequency of link intermittency, thus avoiding occupation of plenty of CPU resources of the router. For example, the intermittency period of the first link intermittency may be set to a short time value such as milliseconds.

Figure 5:
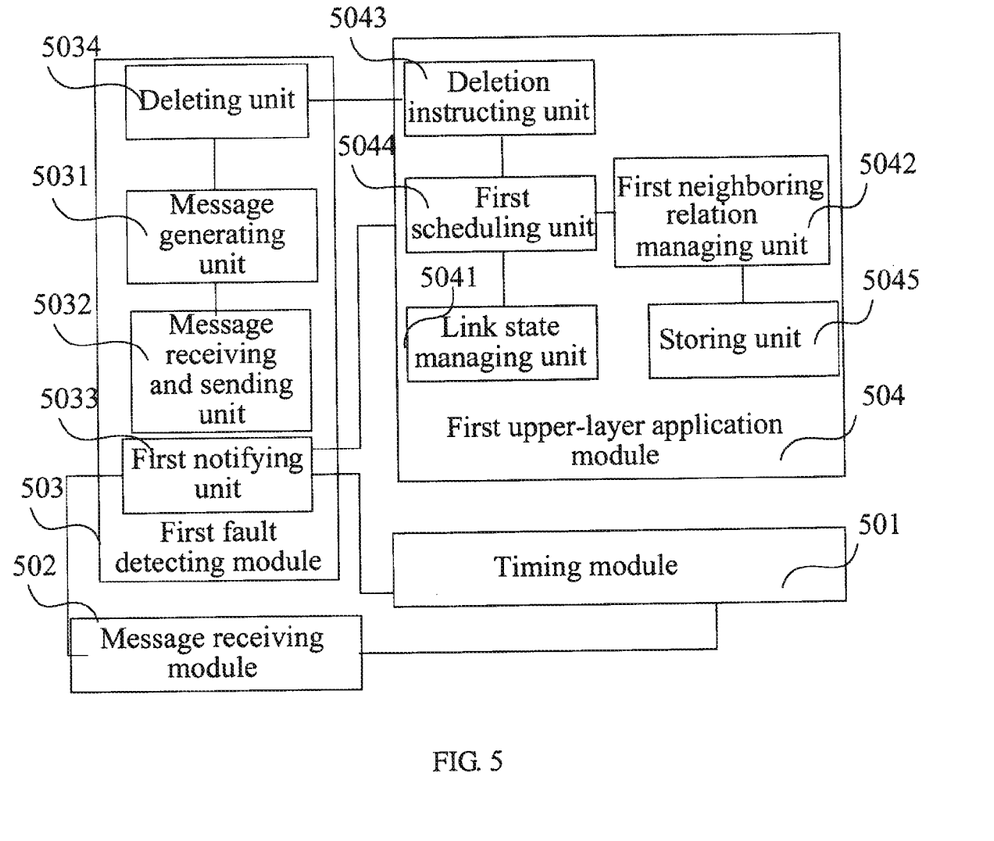
FIG. 5 shows a structure of a data forwarding apparatus in the first embodiment of the present invention.

FIG. 5 shows a structure of a data forwarding apparatus in the first embodiment of the present invention. The first embodiment can implement the process shown in FIG. 2. The data forwarding apparatus in this embodiment includes:

a timing module 501, adapted to count time;

a message receiving module 502, connected with the timing module 501, and adapted to receive a detection message;

a first fault detecting module 503, adapted to: use the detection message to detect faults of the link connected to this apparatus; perform fault detection for the link between data forwarding, apparatuses; and generate a notification message indicative of failure or recovery of the fault detection session when the link fails intermittently between the data forwarding apparatus and a neighboring data forwarding apparatus, or generate a link fault notification message when the link fails continuously between the data forwarding apparatus and the neighboring data forwarding apparatus according to timing information of the timing module 501; and a first upper-layer application module 504, connected with the first fault detecting module 503, and adapted to: manage neighboring relations between the data forwarding apparatuses according to results of the fault detection by the first fault detecting module 503; according to the notification message sent by the first fault detecting module 503, when the link fails intermittently, keep the neighboring relation between the data forwarding apparatus and the neighboring data forwarding apparatus, generate a new link state message indicative of network topology around the data forwarding apparatus, and flood the new link state message to the neighboring data forwarding apparatus in the same autonomous domain; and when the link fails continuously, cut off the neighboring relation between the data forwarding apparatus and the neighboring data forwarding apparatus, and instruct the first fault detecting module 503 to delete the generated fault detection session.

As shown in FIG. 5, the first fault detecting module 503 may include:

a message generating unit 5031, adapted to generate a fault detection message;

a message receiving and sending unit 5032, connected with the message generating unit 5031, and adapted to: send the fault detection message generated by the message generating unit to the neighboring data forwarding apparatus, and receive the fault detection message sent by the neighboring data forwarding apparatus;

a first notifying unit 5033, connected with the timing module 501, the message receiving module 502, and the first upper-layer application module 504, and adapted to: according to the timing information of the timing module 501, if the message receiving module 502 receives no fault detection message from the neighboring data forwarding apparatus at the preset time, generate a notification message indicative of failure of the fault detection session and send the notification message to the first upper-layer application module 504; start a timing module 501 to count time; if the message receiving module 502 receives the fault detection message from the neighboring data forwarding apparatus within an intermittency period after the preset time of receiving the message, generate a notification message indicative of recovery of the fault detection session and send the notification message to the first upper-layer application module 504; or, if the message receiving module 502 receives no fault detection message from the neighboring data forwarding apparatus within the intermittency period after the preset time of receiving the message, generate a link fault notification message and send it to the first upper-layer application module 504; and a deleting unit 5034, connected with the first upper-layer application module 504 and the message generating unit, and adapted to delete the fault detection session generated by the message generating unit according to an instruction of the first upper-layer application module 504.

Further, in the embodiments above, the first upper-layer application module 504 may include:

a link state managing unit 5041, adapted to: generate a new link state message indicative of network topology around the data forwarding apparatus when the link fails intermittently between the data forwarding apparatus and the neighboring data forwarding apparatus, and flood the new link state message to the neighboring data forwarding apparatus in the same autonomous domain;

a first neighboring relation managing unit 5042, adapted to: keep the neighboring relation between the data forwarding apparatus and the neighboring data forwarding apparatus when the link fails intermittently between the data forwarding apparatus and the neighboring data forwarding apparatus, and cut off the neighboring relation between the data forwarding apparatus and the neighboring data forwarding apparatus when the link fails continuously between the data forwarding apparatus and the neighboring data forwarding apparatus;

a deletion instructing unit 5043, connected with the first fault detecting module 503 or its deleting unit, and adapted to instruct the first fault detecting module 503 or its deleting unit 5034 to delete the generated fault detection session when the link fails continuously between the data forwarding apparatus and the neighboring data forwarding apparatus; and a first scheduling unit 5044, connected with the link state managing unit 5041, the first neighboring relation managing unit 5042, the deletion instructing unit 5043, and the first fault detecting module 503 or the deleting unit 5034 in the first fault detecting module 503, and adapted to: according to the notification message sent by the first fault detecting module 503, when the link fails intermittently between the data forwarding apparatus and the neighboring data forwarding apparatus, instruct the link state managing unit 5041 to generate a new link state message and flood the message to the neighboring data forwarding apparatus in the same autonomous domain; when the link fails continuously, instruct the first neighboring relation managing unit 5042 to cut off the neighboring relation between the data forwarding apparatus and the neighboring data forwarding apparatus, and instruct the deletion instructing unit 5043 to send an instruction of deleting the fault detection session to the first fault detecting module 503.

As shown in FIG. 5, in the foregoing embodiments, the first upper-layer application module 504 may further include a storing unit 5045, which is connected with the first neighboring relation managing unit 5042 and adapted to store the neighboring relation table of the data forwarding apparatus.

Figure 6:
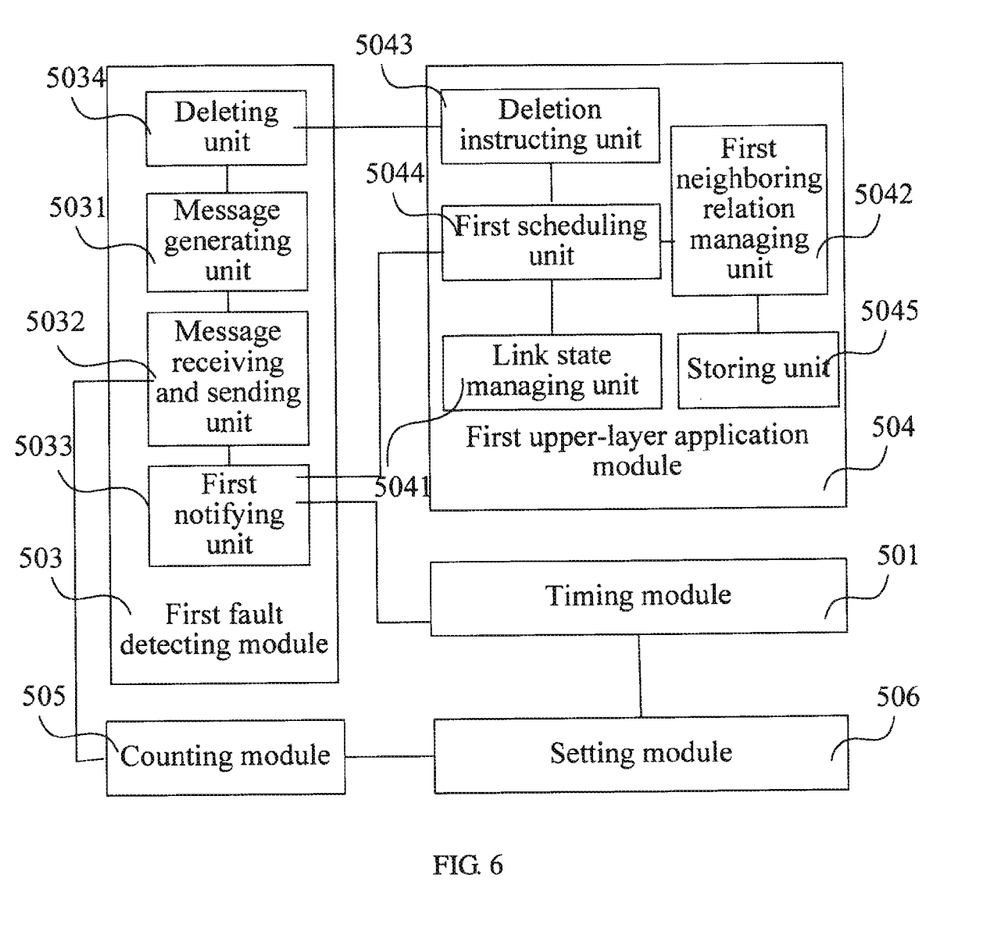
FIG. 6 shows a structure of a data forwarding apparatus in the second embodiment of the present invention.

Further, in the foregoing embodiments, the data forwarding apparatus may include a counting module 505 and a setting module 506. The counting module 505 is connected with the first fault detecting module 503 or its message receiving and sending unit 5032, and is adapted to count intermittency of the link between the data forwarding apparatus and another data forwarding apparatus within a period. The setting module 506 is connected with the counting module 505 and the timing module 501, and is adapted to increase the intermittency period set on the timing module 501 when the count of intermittency increases according to the count result of the counting module 505, where the intermittency period indicates the period of intermittency of the link between the data forwarding apparatus and another data forwarding apparatus. FIG. 6 shows a structure of a data forwarding apparatus in the second embodiment of the present invention.

Figure 7:
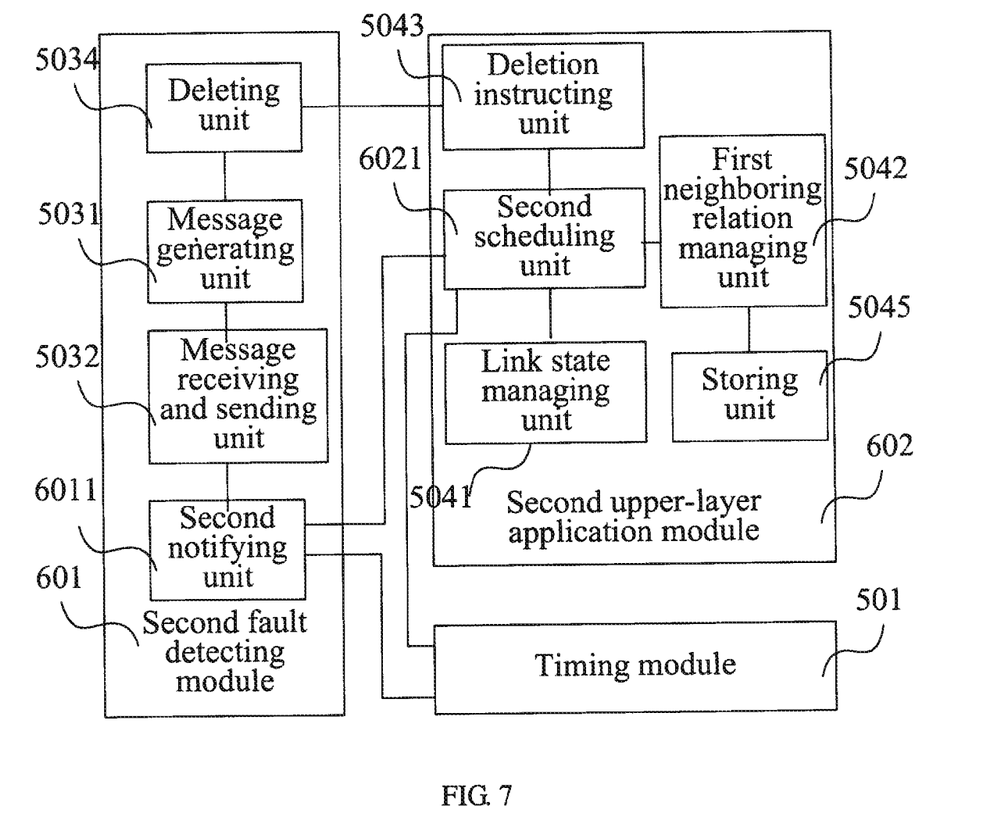
FIG. 7 shows a structure of a data forwarding apparatus in the third embodiment of the present invention.

FIG. 7 shows a structure of a data forwarding apparatus in the third embodiment of the present invention. The first embodiment can implement the process shown in FIG. 3. The data forwarding apparatus in this embodiment includes:

a timing module 501, adapted to count time;

a second fault detecting module 601, connected with the timing module, and adapted to: perform fault detection for a link between data forwarding apparatuses; and generate a notification message indicative of failure or recovery of the fault detection session when the link fails intermittently between the data forwarding apparatus and the neighboring data forwarding apparatus according to timing information of the timing module; and a second upper-layer application module 602, connected with the timing module 501 and the second fault detecting module 601, and adapted to: manage neighboring relations between the data forwarding apparatuses according to results of the fault detection by the second fault detecting module 601; after receiving the notification message indicative of failure of the fault detection session from the second fault detecting module 601, start the timing module 501 to count time, keep the neighboring relation between the data forwarding apparatus and the neighboring data forwarding apparatus, generate a new link state message indicative of network topology around the data forwarding apparatus, and flood the new link state message to the neighboring data forwarding apparatus in the same autonomous domain; if no notification message indicative of recovery of the fault detection session is received from the second fault detecting module 601, within the intermittency period after receiving the notification message indicative of failure of the fault detection session from the second fault detecting module 601, cut off the neighboring relation between the data forwarding apparatus and the neighboring data forwarding apparatus, and instruct the second fault detecting module 601 to delete the generated fault detection session.

As shown in FIG. 7, the second fault detecting module 601 may include:

a message generating unit 5011, adapted to generate a fault detection message;

a message receiving and sending unit 5012, connected with the message generating unit 5011, and adapted to: send the fault detection message generated by the message generating unit 5011 to the neighboring data forwarding apparatus, and receive the fault detection message sent by the neighboring data forwarding apparatus;

a second notifying unit 6011, connected with the message receiving and sending unit 5012, the timing module 501, and the second upper-layer application module 602, and adapted to: according to the timing information of the timing module 501, if the message receiving and sending module 5012 receives no fault detection message from the neighboring data forwarding apparatus at the preset time, generate a notification message indicative of failure of the fault detection session and send the notification message to the second upper-layer application module 602; start a timing module 501 to count time; if the message receiving and sending unit 5012 receives the fault detection message from the neighboring data forwarding apparatus within an intermittency period after the preset time of receiving the message, generate a notification message indicative of recovery of the fault detection session and send the notification message to the second upper-layer application module 602; and a deleting unit 5034, connected with the second upper-layer application module 602 and the message generating unit 5011, and adapted to delete the fault detection session generated by the message generating unit 5011 according to an instruction of the second upper-layer application module 602.

Further, in the embodiment shown in FIG. 7, the second upper-layer application module 602 may include:

a link state managing unit 5041, adapted to: generate a new link state message indicative of network topology around the data forwarding apparatus when the link fails intermittently between the data forwarding apparatus and the neighboring data forwarding apparatus, and flood the new link state message to the neighboring data forwarding apparatus in the same autonomous domain;

a first neighboring relation managing unit 5042, adapted to: keep the neighboring relation between the data forwarding apparatus and the neighboring data forwarding apparatus when the link fails intermittently between the data forwarding apparatus and the neighboring data forwarding apparatus, and cut off the neighboring relation between the data forwarding apparatus and the neighboring data forwarding apparatus when the link fails continuously between the data forwarding apparatus and the neighboring data forwarding apparatus;

a deletion instructing unit 5043, connected with the second fault detecting module 601 or its deleting unit 6012, and adapted to instruct the second fault detecting module 601 or its deleting unit 6012 to delete the generated fault detection session when the link fails continuously between the data forwarding apparatus and the neighboring data forwarding apparatus; and a second scheduling unit 6021, connected with the link state managing unit 5041, the first neighboring relation managing unit 5042, the deletion instructing unit 5043, the timing module 501, and the second fault detecting module 601 or the deleting unit 6012 in the second fault detecting module 601, and adapted to: according to the notification message sent by the second fault detecting module 601, when the link fails intermittently between the data forwarding apparatus and the neighboring data forwarding apparatus, start the timing module 501 to count time, instruct the link state managing unit 5041 to generate a new link state message and flood the message to the neighboring data forwarding apparatus in the same autonomous domain; if no notification message indicative of recovery of the fault detection session is received from the second fault detecting module 601 within the intermittency period after receiving the notification message indicative of failure of the fault detection session from the second fault detecting module 601, instruct the first neighboring relation managing unit 5042 to cut off the neighboring relation between the data forwarding apparatus and the neighboring data forwarding apparatus, and instruct the deletion instructing unit 6012 to send an instruction of deleting the fault detection session to the second fault detecting module 601.

As shown in FIG. 7, the second upper-layer application module 602 may further include a storing unit 5045, which is connected with the first neighboring relation managing unit 5042 and adapted to store the neighboring relation table of the data forwarding apparatus.

Figure 8:
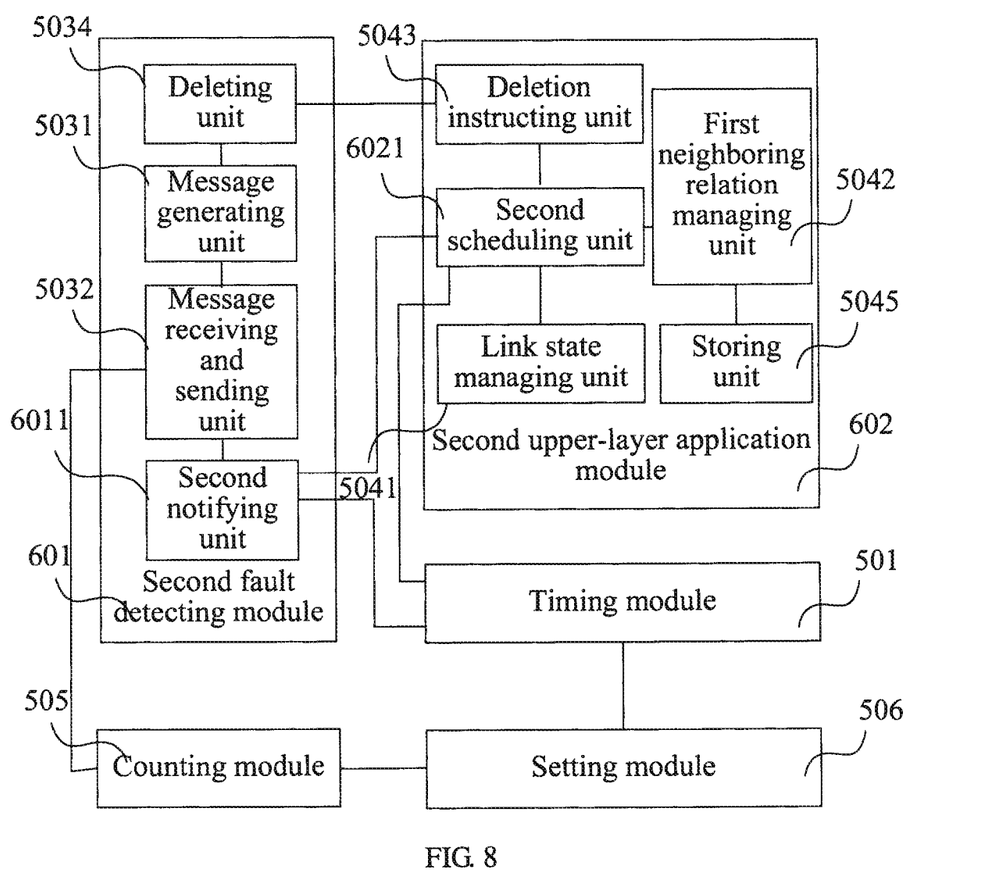
FIG. 8 shows a structure of a data forwarding apparatus in the fourth embodiment of the present invention.

Further, in the foregoing embodiments, the data forwarding apparatus may include a counting module 505 and a setting module 506. The counting module 505 is connected with the second fault detecting module 601 or its message receiving and sending unit 5012, and is adapted to count intermittency of the link between the data forwarding apparatus and another data forwarding apparatus within a period. The setting module 506 is connected with the counting module 505 and the timing module 501, and is adapted to increase the intermittency period set on the timing module 501 when the count of intermittency increases according to the count result of the counting module 505, where the intermittency period indicates the period of intermittency of the link between the data forwarding apparatus and another data forwarding apparatus. FIG. 8 shows a structure of a data forwarding apparatus in the fourth embodiment of the present invention.

Figure 9:
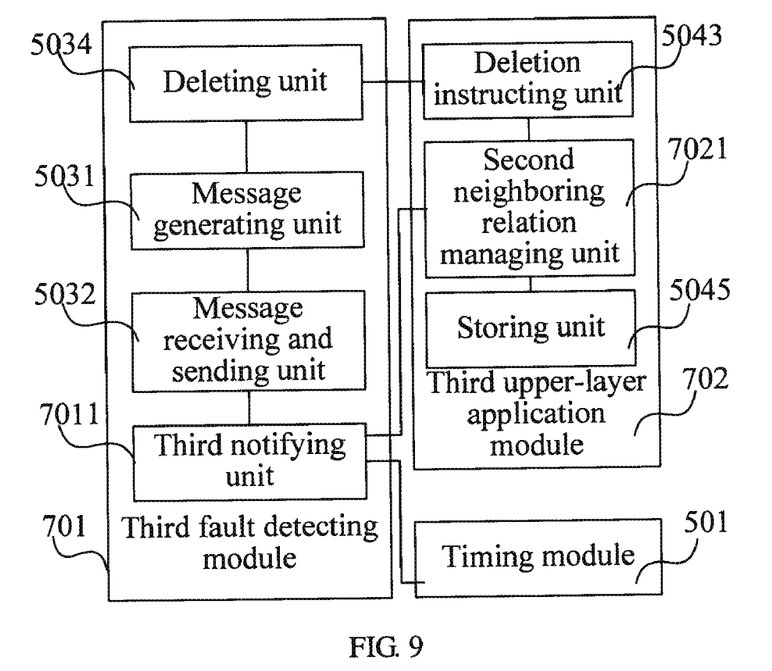
FIG. 9 shows a structure of a data forwarding apparatus in the fifth embodiment of the present invention.

FIG. 9 shows a structure of a data forwarding apparatus in the fifth embodiment of the present invention. The first embodiment can implement the process shown in FIG. 4. The data forwarding apparatus in this embodiment includes:

a timing module 501, adapted to count time;

a second fault detecting module 701, connected with the timing module 501, and adapted to: perform fault detection for a link between data forwarding apparatuses; and generate a link fault notification message when the link fails continuously between the data forwarding apparatus and the neighboring data forwarding apparatus according to timing information of the timing module 501; and a third upper-layer application module 702, connected with the third fault detecting module 701, and adapted to: cut off the neighboring relation between the data forwarding apparatus and the neighboring data forwarding apparatus after receiving the link fault notification message sent by the third fault detecting module 701, and instruct the third fault detecting module 701 to delete the generated fault detection session.

As shown in FIG. 9, the third fault detecting module 701 may include:

a message generating unit 5011, adapted to generate a fault detection message;

a message receiving and sending unit 5012, connected with the message generating unit 5011, and adapted to: send the fault detection message generated by the message generating unit 5011 to the neighboring data forwarding apparatus, and receive the fault detection message sent by the neighboring data forwarding apparatus;

a third notifying unit 7011, connected with the timing module 501, the message receiving and sending unit, and the third upper-layer application module 702, and adapted to generate a link fault notification message and send it to the third upper-layer application module 702 if the message receiving and sending unit 5012 receives no fault detection message from the neighboring data forwarding apparatus within the intermittency period after the preset time of receiving the fault detection message from the neighboring data forwarding apparatus according to the timing information of the timing module 501; and a deleting unit 5034, connected with the third upper-layer application module 702 and the message generating unit 5011, and adapted to delete the fault detection session generated by the message generating unit 5011 according to an instruction of the third upper-layer application module 702.

Further, the third upper-layer application module 702 may include:

a second neighboring relation managing unit 7021, adapted to cut off the neighboring relation between the data forwarding apparatus and the neighboring data forwarding apparatus after receiving the link fault notification message from the message receiving and sending unit 5012; and a deletion instructing unit 5043, connected with the second neighboring relation managing unit 7021 and the third fault detecting module 701, or the deleting unit 5034 in the third fault detecting module 701, and adapted to instruct the third fault detecting module 701 or its deleting unit 5034 to delete the fault detection session generated by the third fault detecting module 701 after the second neighboring relation managing unit 7021 cuts off the neighboring relation between the data forwarding apparatus and the neighboring data forwarding apparatus.

As shown in FIG. 9, the third upper-layer application module 702 may further include a storing unit 5045, which is connected with the second neighboring relation managing unit 7021 and adapted to store the neighboring relation table, of the data forwarding apparatus.

Figure 10:
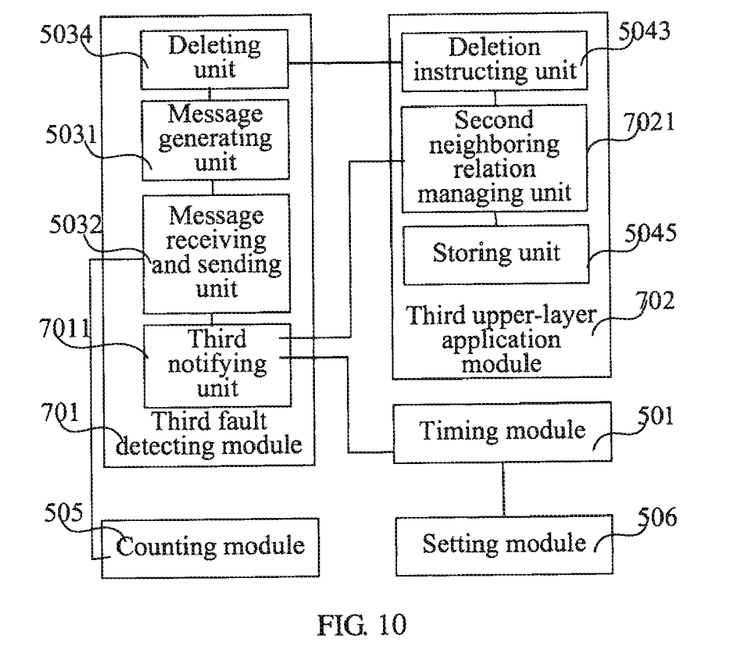
FIG. 10 shows a structure of a data forwarding apparatus in the sixth embodiment of the present invention.

Further, in the foregoing embodiments, the data forwarding apparatus may include a counting module 505 and a setting module 506. The counting module 505 is connected with the third fault detecting module 701 or its message receiving and sending unit 5032, and is adapted to count intermittency of the link between the data forwarding apparatus and another data forwarding apparatus within a period. The setting module 506 is connected with the counting module 505 and the timing module 501, and is adapted to increase the intermittency period set on the timing module 501 when the count of intermittency increases according to the count result of the counting module 505, where the intermittency period indicates the period of intermittency of the link between the data forwarding apparatus and another data forwarding apparatus. FIG. 10 shows a structure of a data forwarding apparatus in the sixth embodiment of the present invention.

Persons of ordinary skilled in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a ROM, a RAM, a magnetic disk, or a CD-ROM.

In the embodiments of the present invention, when the link between the first data forwarding apparatus and the second data forwarding apparatus fails intermittently, the neighboring relation between the first data forwarding apparatus and the second data forwarding apparatus is maintained. In this way, when the link recovers, it is not necessary to wait for the data forwarding apparatus to use its slow handshake (Hello) mechanism to discover the neighboring data forwarding apparatus again, set up the neighboring relation between the data forwarding apparatuses again, or calculate the route between them. Compared with the prior art, the embodiments of the present invention shorten the convergence time of the upper-layer application module and improve the convergence performance. Without the need of re-calculating the route, the CPU resources of the data forwarding apparatus are saved, and the working performance of the data forwarding apparatus is improved.

Besides, the intermittency period may change dynamically, and increase with the increase of the frequency of link intermittency to suit the network change caused by emergencies, thus avoiding occupation of plenty of CPU resources of the router.

Finally, it should be noted that the above embodiments are merely provided for describing the technical solutions of the present invention, but not intended to limit the present invention. It is apparent that persons skilled in the art can make various modifications and variations to the invention without departing from the spirit and scope of the invention. The present invention is intended to cover the modifications and variations provided that they fall in the scope of protection defined by the following claims or their equivalents.

What is claimed is:

1. A link fault handling method, comprising:
by a first data forwarding apparatus, keeping a neighboring relation with a second data forwarding apparatus after a link between the first data forwarding apparatus and the second data forwarding apparatus fails intermittently,
wherein the link between the first data forwarding apparatus and the second data forwarding apparatus fails intermittently in the following way:
a first fault detecting module in the first data forwarding apparatus receives no fault detection message from the second data forwarding apparatus at a preset time, but receives the fault detection message from the second data forwarding apparatus in an intermittency period after the preset time wherein,
when the first fault detecting module receives no fault detection message from the second data forwarding apparatus at the preset time:
the first fault detecting module sends a first notification message to a first upper-layer application module in the first data forwarding apparatus, the first notification message indicating the failure of a fault detection session; and
the first upper-layer application module keeps the neighboring relation with the second data forwarding apparatus, and generates a first new link state message and floods the first new link state message to other data forwarding apparatuses which locate in the same autonomous domain with the first data forwarding apparatus, wherein the first new link state message indicates network topology around the first data forwarding apparatus after the link is cut off.

2. The link fault handling method of claim 1, wherein, when the first fault detecting module receives the fault detection message from the second data forwarding apparatus within the intermittency period:
the first fault detecting module sends a second notification message indicative of recovery of the fault detection session to the first upper-layer application module; and
the first upper-layer application module generates a second new link state message and floods the second new link state message to other data forwarding apparatuses which locate in the same autonomous domain with the first data forwarding apparatus, wherein the second new link state message indicates the network topology around the first data forwarding apparatus after the link recovers.

3. The link fault handling method of claim 1, wherein, when the first upper-layer application module receives no fault detection message from the first fault detecting module within the intermittency period,
the first upper-layer application module cuts off the neighboring relation with the second data forwarding apparatus.

4. The link fault handling method of claim 1, wherein, when the first fault detecting module receives no fault detection message from the second data forwarding apparatus within the intermittency period,
the first fault detecting module sends a link fault notification message to the first upper-layer application module; and
the first upper-layer application module cuts off the neighboring relation with the second data forwarding apparatus.

5. The link fault handling method of claim 3, wherein after the first upper-layer application module cuts off the neighboring relation with the second data forwarding apparatus, the method further comprises:

notifying, by the first upper-layer application module, the first fault detecting module to delete the fault detection session generated by the first fault detecting module; and deleting, by the first fault detecting module, the generated fault detection session.

6. The link fault handling method of claim 4, wherein after the first upper-layer application module cuts off the neighboring relation with the second data forwarding apparatus, the method further comprises:

notifying, by the first upper-layer application module, the first fault detecting module to delete the fault detection session generated by the first fault detecting module; and deleting, by the first fault detecting module, the generated fault detection session.

7. The link fault handling method of claim 1, wherein:
the intermittency period is less than an interval of sending Hello messages.

8. The link fault handling method of claim 1, wherein:
the intermittency period increases with increase of frequency of intermittency of the link between the first data forwarding apparatus and the second data forwarding apparatus.

9. A first data forwarding apparatus, comprising:
a processor; and
a memory configured to store one or more programs which, when executed, cause the processor to:
keep a neighboring relation with a second data forwarding apparatus when the first data forwarding apparatus receives no fault detection message from the second data forwarding apparatus at a preset time, but receives the fault detection message from the second data forwarding apparatus in an intermittency period after the preset time;

generate a first new link state message; and
flood the first new link state message to other data forwarding apparatuses which are located in the same autonomous domain with the first data forwarding apparatus, wherein the first new link state message indicates network topology around the first data forwarding apparatus after the link is cut off.

10. The first data forwarding apparatus of claim 9, wherein the one or more programs when executed further cause the processor to:

cut off the neighboring relation with the second data forwarding apparatus when the first data forwarding apparatus receives no fault detection message from the first fault detecting module within the intermittency period.

11. The first data forwarding apparatus of claim 9, wherein the intermittency period is less than an interval of sending Hello messages.

12. The first data forwarding apparatus of claim 9, wherein the intermittency period increases with increase of frequency of intermittency of the link between the first data forwarding apparatus and the second data forwarding apparatus.

* * * * *